United States Patent
De Luca (10) Patent No.: US 9,360,235 B2
(45) Date of Patent: Jun. 7, 2016

(54) WAVE GENERATED ENERGY FOCUSING LENS AND REFLECTOR FOR SOLAR CONCENTRATION, COLLECTION, AND HARNESSING

(75) Inventor: Nicholas P. De Luca, Carmel-by-the-Sea, CA (US)

(73) Assignee: OAS Design Group, Inc.

(*) Notice: Subject to any disclaimer, the term of this patent is extended or adjusted under 35 U.S.C. 154(b) by 761 days.

(21) Appl. No.: 13/505,196

(22) PCT Filed: Dec. 29, 2010

(86) PCT No.: PCT/US2010/062328
§ 371 (c)(1),
(2), (4) Date: Jul. 24, 2012

(87) PCT Pub. No.: WO2011/090742
PCT Pub. Date: Jul. 28, 2011

(65) Prior Publication Data
US 2012/0279490 A1    Nov. 8, 2012

Related U.S. Application Data

(63) Continuation of application No. 12/648,889, filed on Dec. 29, 2009, now abandoned.

(60) Provisional application No. 61/361,706, filed on Jul. 6, 2010.

(51) Int. Cl.
*F24J 2/40* (2006.01)
*F24J 2/52* (2006.01)
(Continued)

(52) U.S. Cl.
CPC *F24J 2/5267* (2013.01); *F24J 2/08* (2013.01); *F24J 2/10* (2013.01); *Y02E 10/47* (2013.01)

(58) Field of Classification Search
CPC ........ F24J 2/1057; F24J 2/5267; G02B 26/08
USPC ........................................................ 126/561
See application file for complete search history.

(56) References Cited

U.S. PATENT DOCUMENTS 1,088,239 A * 2/1914 Paine .......................... 114/65 R
4,038,972 A    8/1977 Orrison
(Continued)

FOREIGN PATENT DOCUMENTS

JP         08130982 A *  5/1996 ............... A01G 7/00
WO     WO 94/28361     12/1994
WO     WO 95/21358      8/1995

OTHER PUBLICATIONS

Geekologie, "Device Writes on Water," Published Jul. 24, 2006, http://www.geekologie.com/2006/07/device-writes-on-water.php, Accessed by the examiner on [May 5, 2013].

(Continued)

*Primary Examiner* — Jorge Pereiro
(74) *Attorney, Agent, or Firm* — Capitol City TechLaw; Jasbir Singh (57) ABSTRACT

A solar concentration system and a solar collection and concentration system both comprising a wave generator immersed in a fluid and processes for collecting and/or concentrating solar energy are disclosed. The solar collection and concentration system comprises a vibrating ring or ring assembly (1001), a pole or column (1009), a liquid medium used as a reflective surface, a vibration or actuation element (1001, 1003) and an energy absorption, transfer, or converting element (1019, 1020).

20 Claims, 10 Drawing Sheets

(51) Int. Cl.
*F24J 2/08* (2006.01)
*F24J 2/10* (2006.01)

(56) References Cited

U.S. PATENT DOCUMENTS

| | | | |
|---|---|---|---|
| 4,078,549 A | 3/1978 | Mckeen et al. | |
| 4,098,264 A | 7/1978 | Brokaw | |
| 4,214,572 A * | 7/1980 | Gonder | 126/577 |
| 4,315,500 A * | 2/1982 | Gonder | 126/567 |
| 4,350,143 A | 9/1982 | Laing et al. | |
| 4,406,162 A | 9/1983 | Hark | |
| 4,406,243 A * | 9/1983 | Kim | 114/264 |
| 4,581,897 A | 4/1986 | Sankrithi | 60/641.12 |
| 5,075,564 A | 12/1991 | Hickey | |
| 5,447,147 A * | 9/1995 | Stirbl et al. | 126/714 |
| 5,578,140 A * | 11/1996 | Yogev et al. | 136/246 |
| 5,593,549 A | 1/1997 | Stirbl et al. | |
| 5,755,217 A * | 5/1998 | Stirbl et al. | 126/714 |
| 6,349,718 B1 | 2/2002 | Ven et al. | 126/685 |
| 6,631,032 B2 | 10/2003 | Ryutov et al. | |
| 6,936,994 B1 * | 8/2005 | Gimlan | 320/101 |
| 6,953,038 B1 | 10/2005 | Nohrig | 126/694 |
| 6,959,993 B2 | 11/2005 | Gross et al. | 359/853 |
| 7,192,146 B2 | 3/2007 | Gross et al. | 359/853 |
| 7,568,479 B2 | 8/2009 | Rabinowitz | 126/600 |
| 8,307,820 B2 * | 11/2012 | King et al. | 126/634 |
| 8,328,367 B2 | 12/2012 | Nemeth et al. | |
| 8,443,615 B2 * | 5/2013 | King et al. | 62/115 |
| 2002/0185124 A1 | 12/2002 | Blackmon, Jr. et al. | 126/680 |
| 2008/0098678 A1 * | 5/2008 | Phillip | 52/294 |
| 2009/0038608 A1 | 2/2009 | Caldwell | 126/600 |
| 2009/0211566 A1 | 8/2009 | Battiston | |
| 2009/0229264 A1 | 9/2009 | Gilon et al. | |
| 2011/0030675 A1 * | 2/2011 | King et al. | 126/634 |
| 2011/0070635 A1 * | 3/2011 | King et al. | 435/292.1 |
| 2011/0113806 A1 * | 5/2011 | King et al. | 62/235.1 |
| 2011/0126825 A2 * | 6/2011 | King et al. | 126/634 |
| 2012/0234668 A1 * | 9/2012 | King et al. | 204/157.5 |
| 2012/0281152 A1 | 11/2012 | Nemeth et al. | |
| 2013/0032136 A1 * | 2/2013 | King et al. | 126/625 |

OTHER PUBLICATIONS

International Search Report and Written Opinion mailed Jul. 11, 2011 for application No. PCT/US2010/062328 filed Dec. 29, 2010.
Engadget—Researchers use Waves to write on water; Blass, Evan; Published Jul. 26, 2006; Accessed by Examiner on Nov. 21, 2015; http://www.engadget.com/2006/07/25/researchers-using-waves-to-write-on-water/.

* cited by examiner

WAVE GENERATED ENERGY FOCUSING LENS AND REFLECTOR FOR SOLAR CONCENTRATION, COLLECTION, AND HARNESSING

This application is a 371 filing of International Patent Application PCT/US2010/062328 filed Dec. 29, 2010, which claims the benefit of U.S. application Ser. No. 12/648,889 filed Dec. 29, 2009 and U.S. Provisional Application No. 61/361,706 filed Jul. 6, 2010.

INTRODUCTION

The generation of solar energy has become a major focus of society in an attempt to relieve its dependence on oil, coal, and other fossil fuels. There are two primary methods for generating power from solar energy. The first involving radiating a photovoltaic solar panel to generate an electrical voltage and second, concentrating solar energy onto a target which absorbs the energy as heat and then converting the heat to power (generally via steam). In both cases, the cost associated with the setup of the systems and the level of the power produced make the power expensive in comparison to alternatives such as coal burning power plants.

In considering concentrator (or concentration) systems, the use of mirrors is widely favored versus using lenses to concentrate solar energy. This is primarily due to the increased cost associated with forming a glass lens compared to using a sheet metal material to form the mirror. The high cost of concentrator systems is also attributable to the set-up and electromechanical tracking of the mirrors onto a fixed target. The target is generally a heat absorbing system which converts water to steam via heat transfer pipes and a steam turbine.

Gross et al., in U.S. Pat. Nos. 7,192,146 and 6,959,993 describe a heliostat array that is mechanically linked. Nohrig in U.S. Pat. No. 6,953,038 describes a mechanical frame as does Ven in U.S. Pat. No. 6,349,718. U.S. Pat. No. 7,568,479 by Rabinowitz discloses a Fresnel lens apparatus used for solar concentration and the associated mechanical systems. In attempting to make large collection areas, capable of generating significant commercial power levels, all these systems are inherently encumbered by the electromechanical systems required to move and adjust the mirrors onto a target area.

Researchers at the Akishima Laboratories in Japan and Professors Etsuro Okuyama and Shigero Haito at the University of Osaka have been able to use synchronized wave generators to create letters in standing pools of water.

OBJECTS OF INVENTION

It is therefore an object of the current invention to allow for the production of power on a large scale at low capital costs from a stimulated liquid surface. Ideally, said system using a concentrating mirror array or lens array that does not require moving fixtures or framing to support the mirrors or lenses. It is further an object of the current invention to allow for controlled power generation on a large scale. It is further an object of the current invention to minimize the environmental impact of the power generation. A system according to the present invention provides a unit that can be easily manufactured, is economical, easy to use, and efficiently enables solar power concentration and collection.

SUMMARY OF INVENTION

In summary, the following invention comprises forming a mirror or lens by creating a composite wave structure within a liquid medium formed by the interference pattern of waves created from one or more wave generators placed in contact with or in close proximity to the liquid. The wave generators may be outfitted with integrated or stand alone sensors to detect the background waves (i.e., waves due to wind effects) and the computer system controlling the wave generator(s) to apply a wave to correct for the noise. The liquid medium may also have a top reflective coating upon which incident solar radiation reflects to achieve focusing upon a target. The target being located at a focal distance of the formed mirror or lens.

As an example, consider a 3,218 meter diameter ring that is formed using 33,158 coupled wave generators, each located along the circumference of the ring, each 0.3 meters wide, and the assembly placed within a standing body of water, such as a river, lake, or pool. The generators potentially being solar powered, each connected in series or in parallel and actuated with a timed electronic modulated driver so as to create a standing or moving wave which resembles a lens or a mirror. Each wave generator may be further controlled directly through a cable or via an electromagnetic signal and a computer and further use feedback from various sensors including ambient wave height sensors. An aluminum powder or other reflective material may be spread over the liquid medium in order to increase the reflective strength of the created mirror. The mirror is dynamically created and moved such that the incident angle of the sun forms a reflected image on a focus point. The focus point may be located above or below the lens on a stationary, moving, floating, or hovering platform which further transforms the energy to another medium for electrical power generation or to a surface that provides a secondary reflective surface to transfer the energy. A single mirror of this size could reflect upwards of 1 giga watts of solar energy (at an average sun field density of 300 watts per square meter).

As another example, consider a 3 meter diameter ring that is fitted with 31 wave generators, each 0.3 meters wide and placed within a standing body of water, such as a river, lake, ocean, or pool. Multiple rings may be arrayed so as to create a composite field of mirrors. A field of 500 mirrors, each capable of reflecting 1,000 watts of solar energy (at an average sun field density of 300 watts per square meter) consisting in total of 15,500 wave generators could provide 0.5 MW of reflected sun energy.

As another example, the following invention comprises collecting energy from light reflected from a lens that is formed within a liquid medium by the wave pattern created with an oscillating or vibrating ring. Said ring may also be used in conjunction with a precisely located pole that is heat absorbent or has solar panels located on it to collect solar energy. The heat may be transferred to a heat pump, steam generator or the liquid medium itself for use and the power from the solar panels transferred for storage or immediate use. The pole may also be fitted with mirrors used to further reflect the light to secondary energy collection devices.

In a preferred embodiment the pole is located centrally to the ring and may be further mechanically attached to the ring. Additional wave generators and sensors may be outfitted to the system to further detect the background waves (i.e. waves due to wind effects) and the computer system controlling the wave generator(s) so as to apply a wave to correct for the noise. The liquid medium may also have a top reflective coating upon which incident solar radiation reflects to achieve focusing upon a target. The invention will be further described in conjunction with the accompanying drawings, tables, and examples.

DETAILED DESCRIPTION

Figure 1:
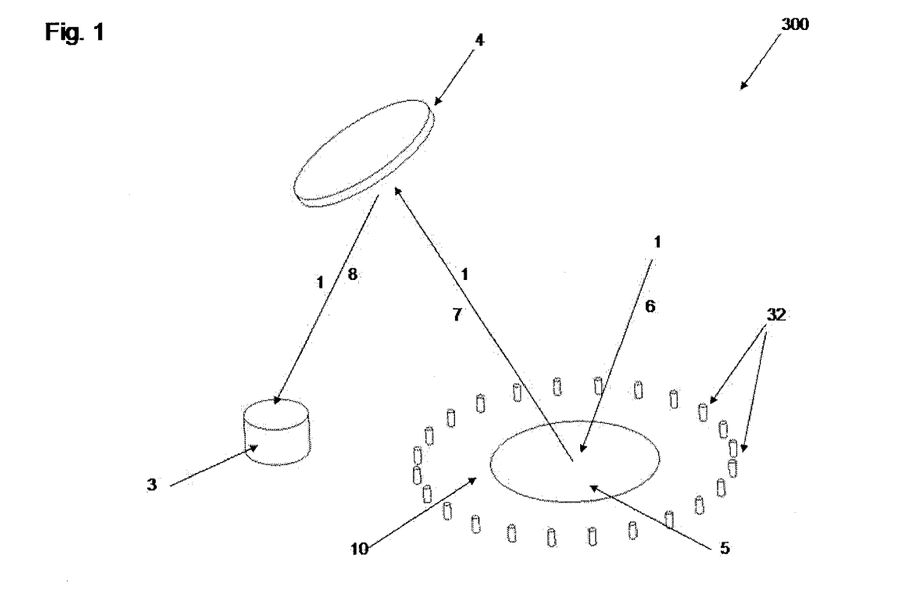
FIG. 1 is an isometric view of an example of a wave generator solar concentrator system.

FIG. 1 illustrates a wave concentration system 300 consisting of wave generators 32 activated to form a focusing or reflecting lens surface 5 within a liquid medium 10. The surface formed may act as a mirror or a lens, in a manner similar to conventional concave or convex lenses and reflectors. The liquid medium may have a surfactant within it that floats on the surface to increase the reflectance of the surface or the medium may include dissolved or partially dissolved solids or other components to improve the formed lens characteristics. Light beam 1, most generally coming from the sun coming from path 6, being reflected in a coherent manner by the generated wave surface 5 to a secondary reflector 4 via path 7. Reflector 4 being mounted to a stationary land based fixture or attached to a tethered system or mounted above the generated wave surface through a floating, flying, or other self lifting system. Reflector 4 further passing light beam 1 to target 3 via path 8. Target 3 may be single or multiple solar cells to convert the light into electrical energy, or a heat absorbing unit such as a salt bath further used to convert water to steam and then electrical energy or other target for other use.

Figure 2A:
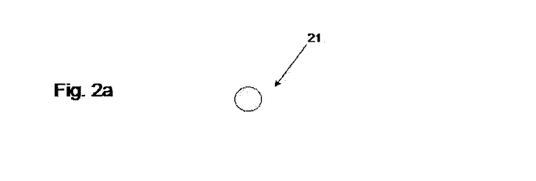
FIGS. 2a, 2b, and 2c are isometric views of alternate wave generator solar concentrator systems and light reflection paths.
Figure 2B:
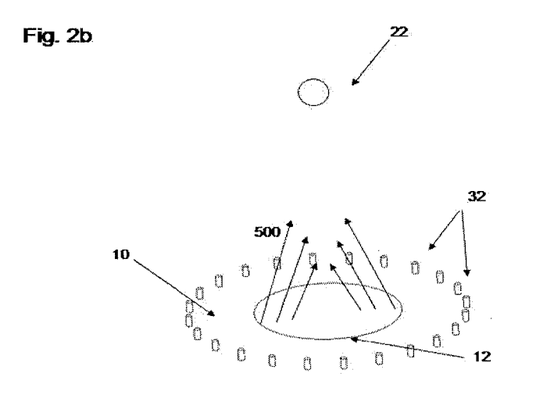
Figure 2C:
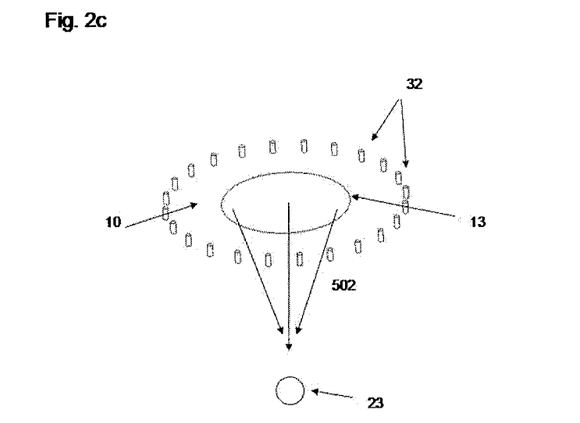

FIGS. 2a, 2b, and 2c illustrate various lenses or reflectors 11, 12, and 13 respectively created via wave generators 32. In FIG. 2a, the sun light 501 is reflected to target 21 located above and offset to the center of the surface of the liquid medium 10, while in FIG. 2b the sun light 500 is focused directly above to target 22. In FIG. 2c the sun light 502 is focused into the liquid medium to a target 23 located below the surface of the liquid medium. In FIGS. 2a, 2b, and 2c the respective targets 21, 22, and 23 may behave similarly to reflector 4 or target 3 of FIG. 1 or both.

FIGS. 3a, 3b, 3c, 3d, 3e, 3f, 3g, 3h, 3i, and 3j illustrate different configurations and placements of wave generators 32, 35, 40, and 600 used for creating the reflector or lens 30 in the areas of 31 and 50 (indicated by the dashed line). The optimization of the number of generators required can be modeled using computer systems and the ambient surface conditions and noise created by winds or by other objects passing nearby, such as boats, can be modeled as well to optimize the system.

Figure 3A:
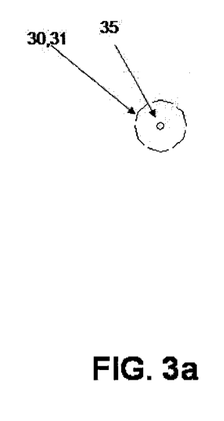
FIGS. 3a through 3j are schematics showing alternative placements of generators used for generating a wave formed lens in a solar concentrator system.
Figure 3B:
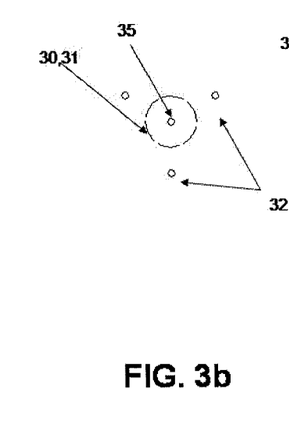
Figure 3C:
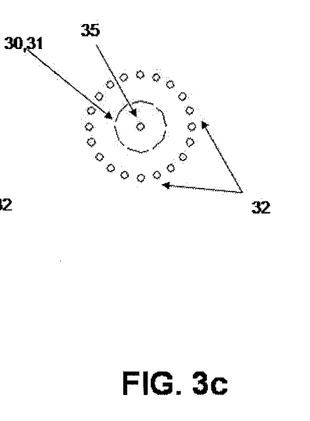
Figure 3D:
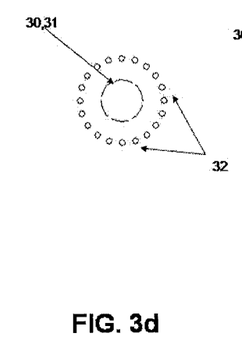
Figure 3E:
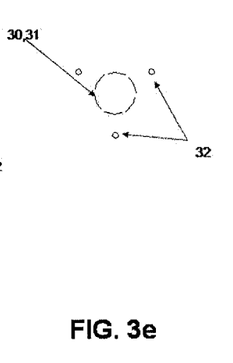
Figure 3F:
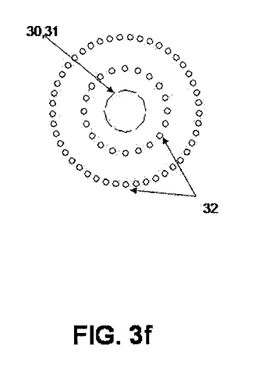

FIGS. 3a, 3b, and 3c illustrate a lens or reflector 30 created using a central generator 35 as well as combined with additional generators 32 placed in a circular pattern around the central generator 35. In FIGS. 3d, 3e, and 3f the central generator 35 is removed and single or multiple generators 32 are placed around the intended lens or reflector region 31. The algorithms used to create the waves constantly adjusting to account for the light source's position with respect to the lens and/or target(s) as well as any ambient wave noise or disturbance. In FIG. 3f, multiple rings of generators 32 are circumscribed and these may be located at different depths within the medium 10.

Figure 3G:
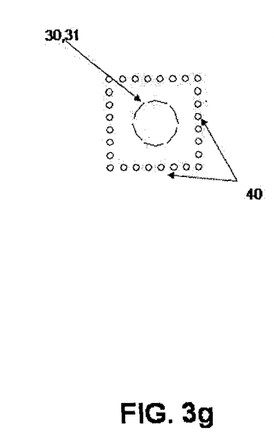
Figure 3H:
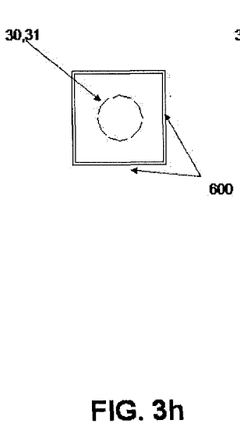
Figure 3I:
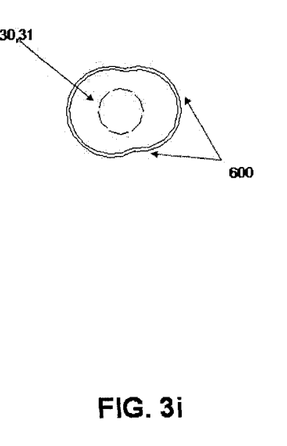

In FIGS. 3g, 3h, and 3i, the wave generators are placed in a non-circular fashion to form a lens or reflector in region 31. While FIG. 3g illustrates multiple independent wave generators 40 arranged in a square pattern, FIGS. 3h and 3i use continuous vibrating assemblies 600 such a piezo electric surfaces shaped as a square and combined circles respectively to form the lens or mirror in region 31. Such mixer systems further described by Berg and De Luca in Review of Scientific Instruments, Volume 62, Issue 2, February 1991, pp. 527-529, "Milliwatt Mixer for Small Fluid Samples." Assemblies 40 and 600 may be further used in conjunction with central generators 32.

Figure 3J:
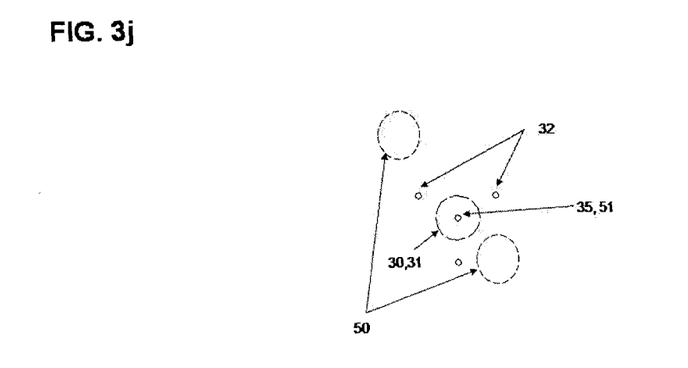

In FIG. 3j the wave generators 32 and 35 form a central lens or reflective area 31 and may also form single or multiple lens or reflective areas 50 located off center to the primary central symmetry point 51.

Figure 4:
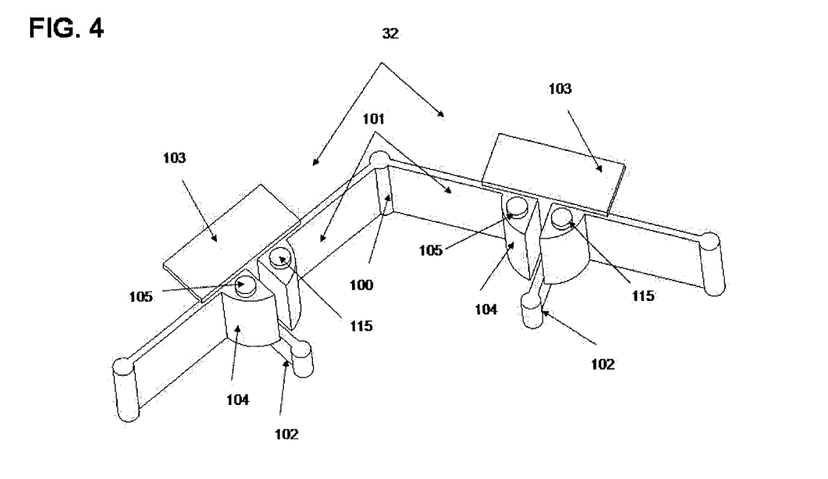
FIG. 4 is an isometric view of a multiple wave generator and the electronic controls.

FIG. 4 illustrates multiple wave generators 32 bound together at pivot 100 via arms 101 with angular encoders. Each generator equipped with a primary actuation unit 102 that produces the waves; these waves being created through a single or multiple controlled motions which may include rotary, linear, impact, harmonic, or turbulent actuation. The energy required to create the motion may be fed directly through an external power supply, an internal power supply, or may comprise a renewable energy source such as the solar panels 103. Each generator 32 may also include a battery 104 to help power the unit including in case of low sun conditions and may also include GPS and sun tracking systems 105. The generators may also include equipment able to communicate local conditions such as ambient wave conditions, adjacent generator encoder value, absolute position, fluid temperature and velocity at port and antenna 115. Wave generator 32 may be combined with additional equipment such as flotation or translocation equipment.

Figure 5:
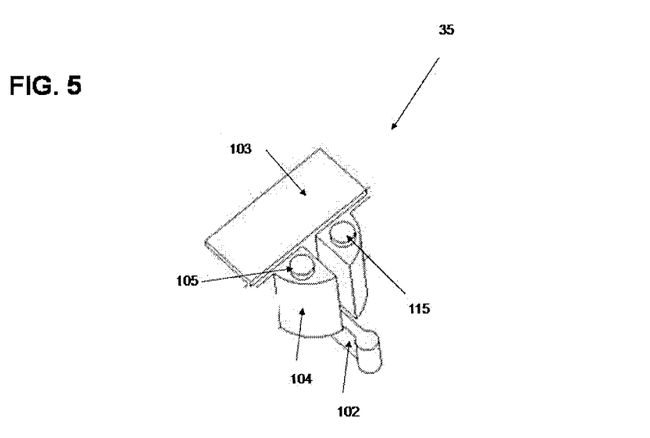
FIG. 5 is an isometric view of a single wave generator and the electronic controls.

FIG. 5 illustrates a single wave generator 35 equipped with a primary actuation unit 102 that produces the waves; these waves being created through a single or multiple controlled motion(s) which may include rotary, linear, impact, harmonic, or turbulent actuation. The energy required to create the motion maybe fed directly through an external power supply, an internal power supply, or may comprise a renewable energy source such as the solar panels 103. Each generator 35 may also include a battery 104 to help power the unit including in case of low sun conditions and may also include GPS and sun tracking systems 105. The generators may also include equipment able to communicate local conditions such as ambient wave conditions, adjacent generator encoder value, absolute position, fluid temperature and velocity input at port and antenna 115. Wave generator 35 may be combined with additional equipment such as flotation or translocation equipment.

Figure 6:
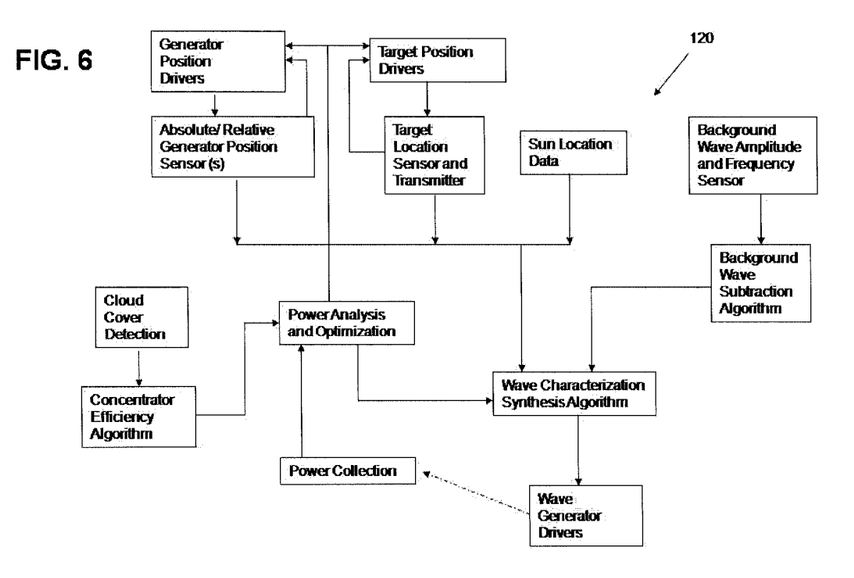
FIG. 6 is a schematic drawing illustrating the control system matrix and algorithms used to modulate the wave generator system.

FIG. 6 illustrates an electronic control circuit 120 used to control one or more wave generators in a complete system such as 300 shown in FIG. 1. At the onset, the sun position may be obtained using GPS or sensory information and combined with the information relating the generator position(s) and the target position(s); further communicated to a central computer for processing from the individual sensors located on each generator and the target. The wave generator algorithm will use the position information and combine this with sensory information obtained about the background noise to create driver information for each of the wave generators. Upon collection of the power at the target area, the energy obtained can be compared to baseline quantities and the reflective or lens characteristics can be optimized. The cloud cover may also be factored into the optimization algorithms and in some cases the generators may be shut down to prevent loss of energy due to insufficient energy generation. In addition, fluid additives used to optimize reflection or refraction may be controlled via the control system and target and generator positions may be further altered based on optimization of energy collection.

Figure 7:
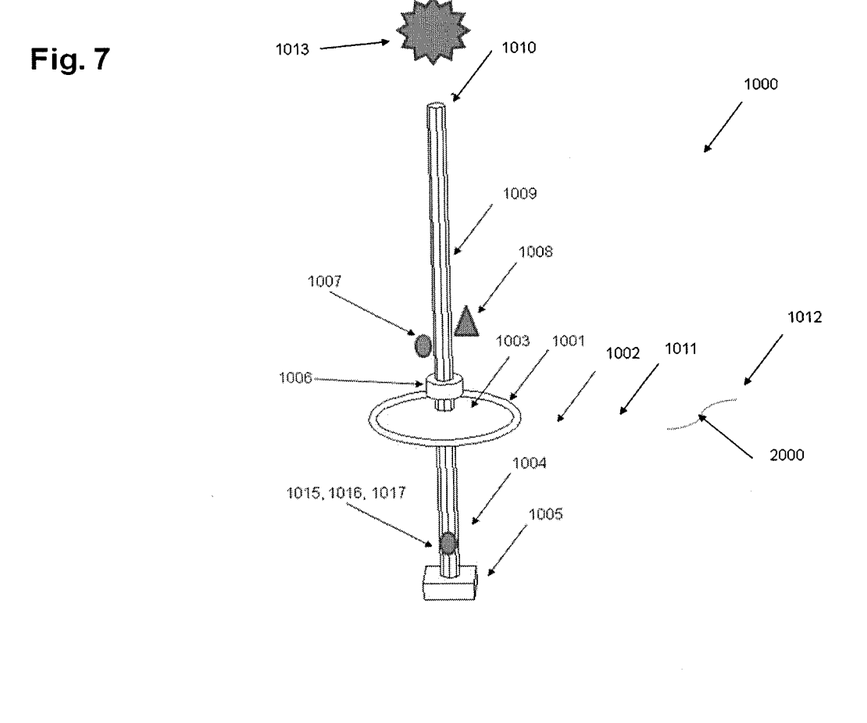
FIG. 7 is an isometric view of an example of a ring wave generator solar concentrator system.

FIG. 7 illustrates an example of a ring wave generator solar concentrator system 1000 according to one embodiment of the invention. The system 1000 comprising the primary components of a ring 1001 positioned in a body of fluid 1002 with a vibration assembly 1003 which may or may not be anchored to a post 1004 anchored to ground or bedrock 1005. The vibration assembly 1003 moves in response to actuation from an electromechanical system 1006 which requires powering from a stored energy system 1007 or directly from alternative energy such as solar or wind energy 1008. Thus, in this example, vibration assembly 1003 and electromechanical system 1006 can act as the wave generators of the system. Electromechanical system 1006 can be located above ring 1001 and can include gears and a motor in order to actuate (i.e., push up and down) ring 1001 in order to make waves. Pole 1009 is located at a focal point 1010 of the reflective surface 1011. In one case, the reflective surface comprising water is vibrated to form waves 1012 of which part of the wave 2000 is positioned so as to reflect the light coming from the sun 1013 at the pole 1009. The pole 1009 may be permanently affixed to post 1004 or may float freely in the liquid body 1002. Pole 1009 may also have a drive system 1015 that includes a gyroscope 1016 and other stabilization systems 1017 that hold the pole in the most appropriate location to maximize the collection of light. Pole 1009 may be of various shapes including square, cone, oval, and circular and of a height ranging from 0.25 to 500 m.

Figure 8A:
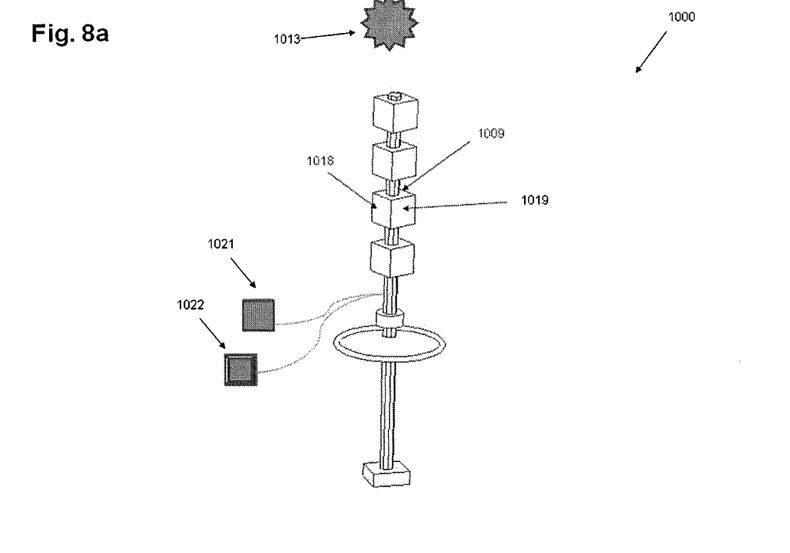
FIGS. 8a, 8b, and 8c are isometric views of the collection poles used in conjunction with a ring wave generator.
Figure 8B:
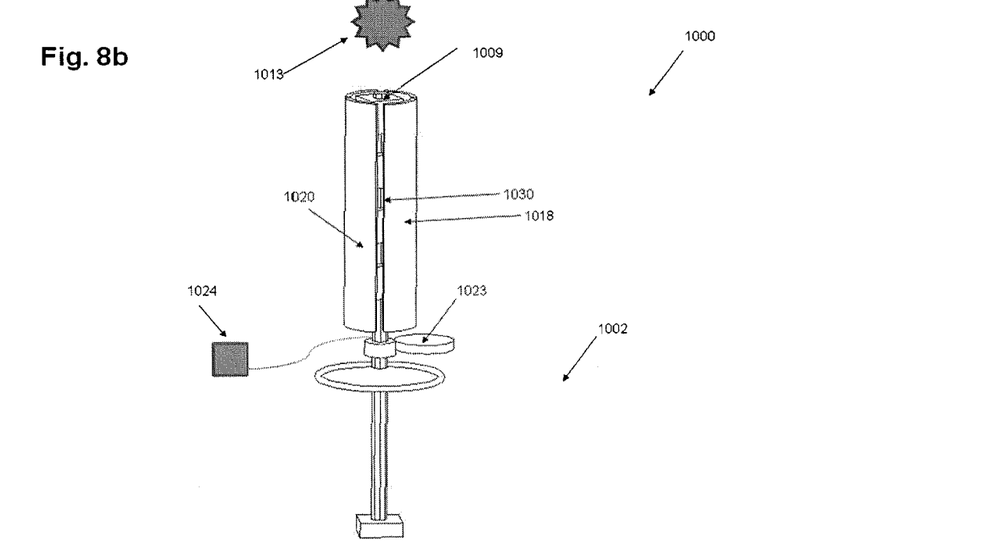
Figure 8C:
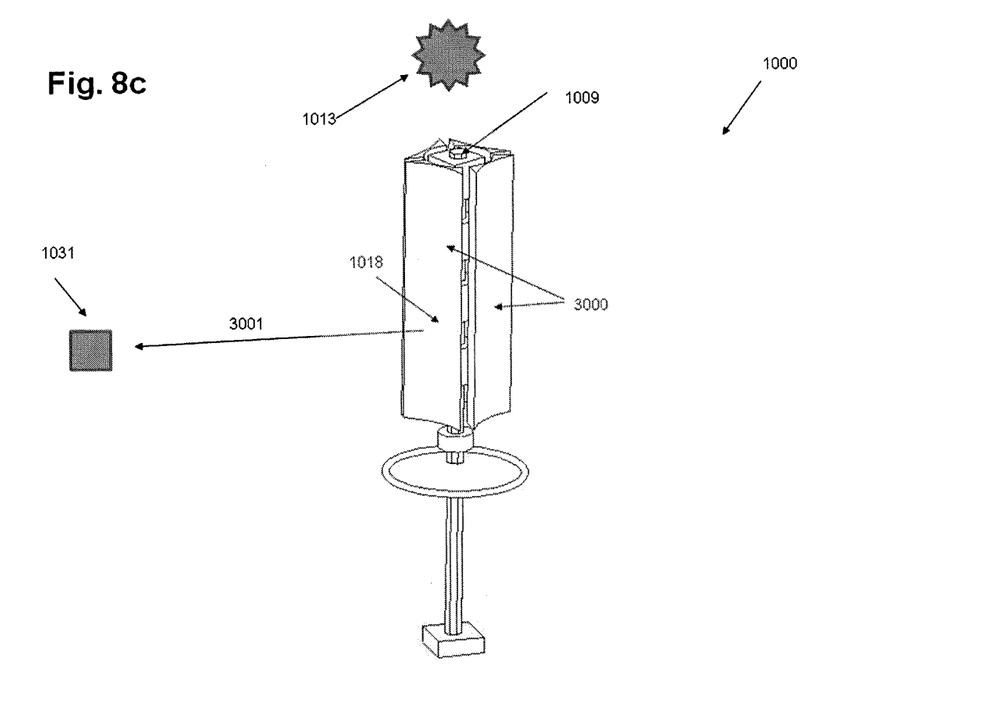

As shown in FIGS. 8a, 8b, and 8c pole 1009 is further lined or sheathed with an energy absorbing surface 1018 such as a solar panel 1019 in FIG. 8a or heat pipe 1020 in FIG. 8b. The energy may be converted into electricity and stored (for example in batteries 1021 of FIG. 8a or a molten salt system 1024 in FIG. 8b or used directly by appliance 1022 in FIG. 8a). In FIG. 8b, water 1002 can be used within heat pipe 1020 and further used to make steam to drive and a steam generator 1023. In some cases the surface 1018 may be movable with positioners 1030 so as to allow for maximized solar collection. In FIG. 8c surface 1018 may also be formed with one or more mirrors 3000 that may also be individually moved to reflect the light 3001 to a secondary energy harnessing location 1031.

Figure 9:
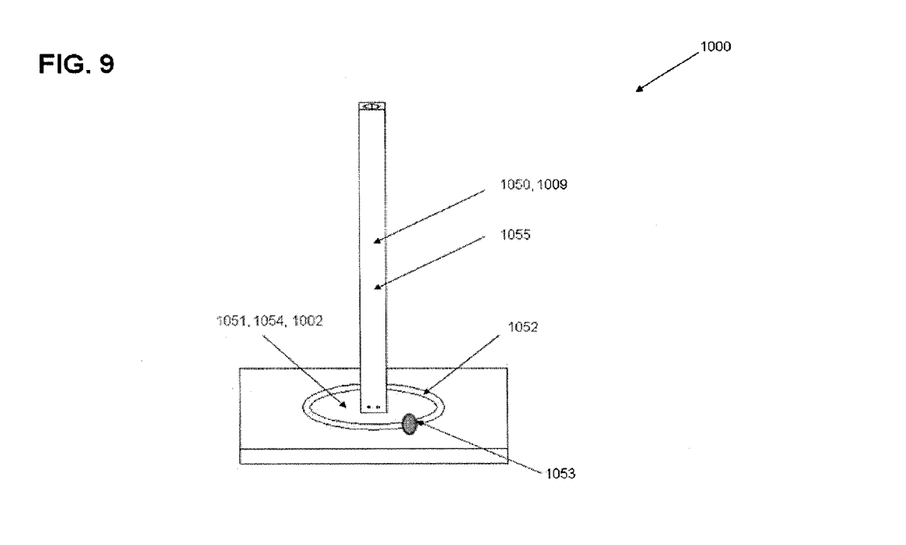
FIG. 9 illustrates the current invention integrated in the construction of an office building.

FIG. 9 illustrates system 1000 integrated with a large office building 1050 wherein the building can be used to harness energy similarly to pole 1009 in FIGS. 7, 8a, 8b, and 8c and a fountain 1051 or pond 1054 around the building can form a body of water as 1002 in FIG. 7. A wave generating ring 1052 can be mounted to move with electromechanical vibrators 1053 to generate power. Thus, in this example, electromechanical vibrators 1053 can act as the wave generators of the system. Electromechanical vibrators 1053 can be located above ring 1052 and can include flappers and a motor in order to actuate (i.e., push up and down) ring 1052 in order to make waves. Solar panels 1055 may be mounted in place of windows and/or attached to the building surface to optimize the collection of power.

Figure 10A:
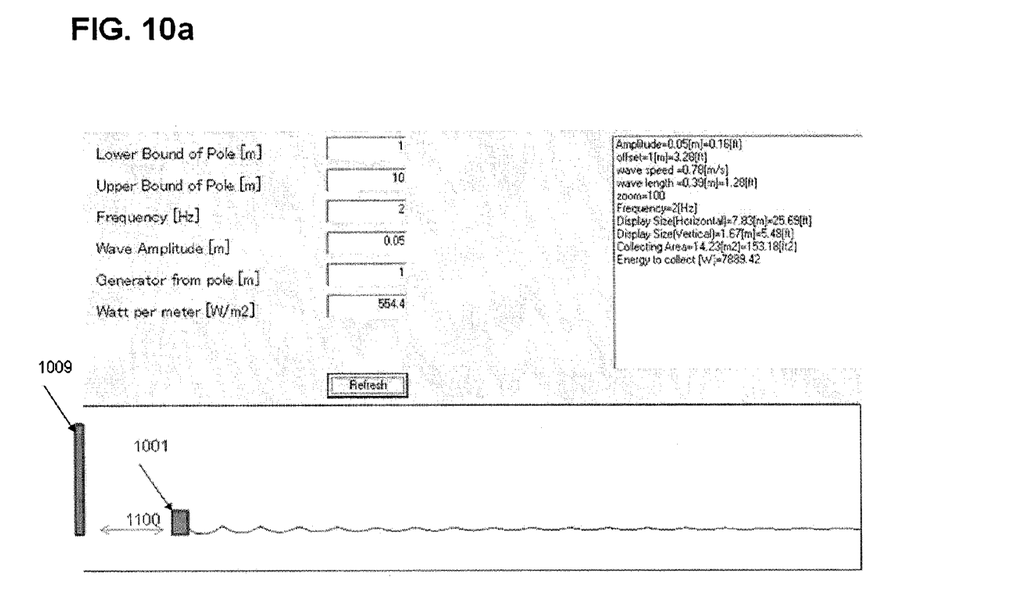
FIGS. 10a, 10b, and 10c illustrate optimized waves created using various ring generators and centrally located collection poles.
Figure 10B:
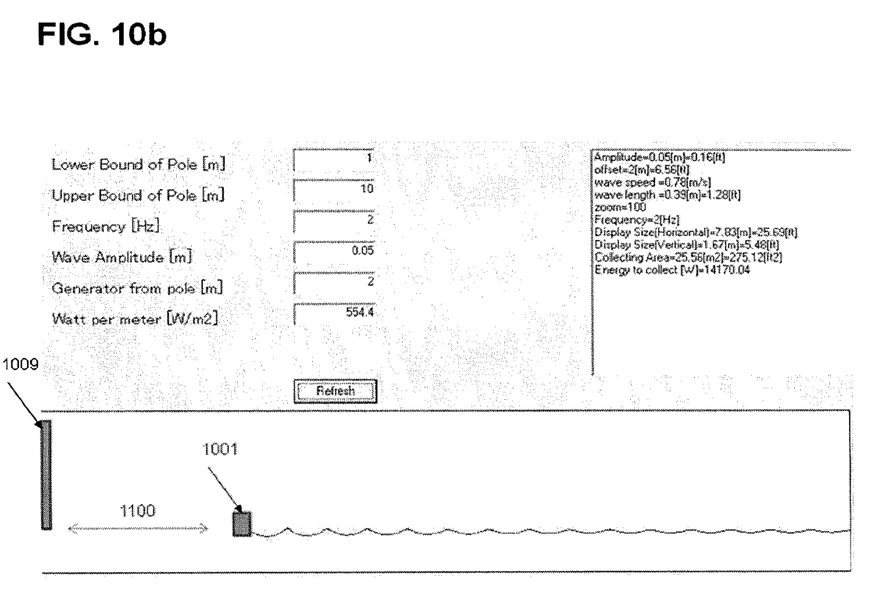
Figure 10C:
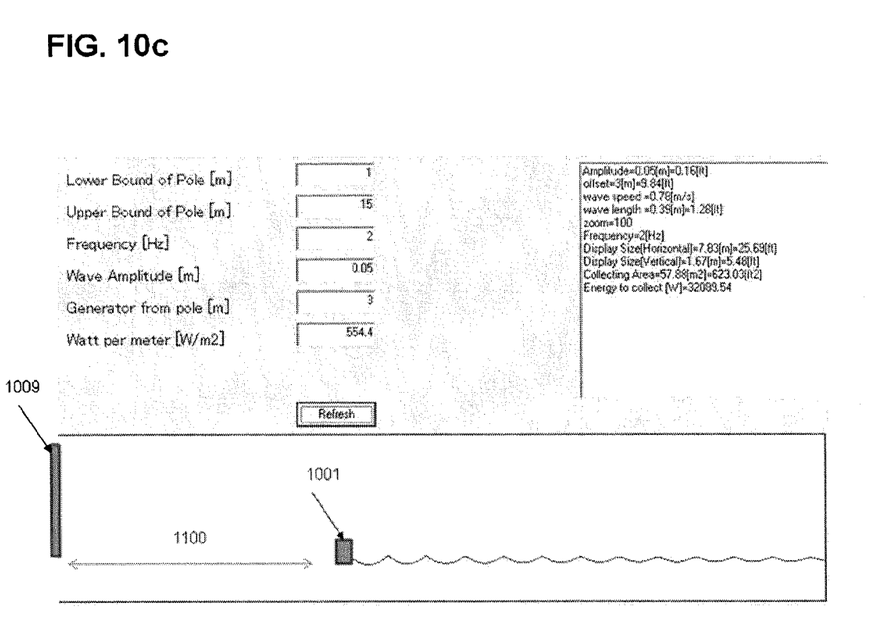

FIGS. 10a, 10b, and 10c illustrate optimized waves created using various simulated ring generators and centrally located collection poles. The simulation show only a cross sectional of pole 1009 and ring 1001 of FIG. 7. The position of the energy absorption pole 1009 of FIG. 7 is located at central point 1100 in FIGS. 10a, 10b, and 10c and the ring wave generator 1001 is of radius 1101. In the simulations shown in FIGS. 10a, 10b, and 10c, it is assumed that the sun is located directly above the pole 1009. The energy is calculated by evaluation of the wave surface produced in a medium 1002 of water with associated density and wave propagation velocity and characteristics, and an average energy of 554 Watts per square meter from the sun with no attenuation affects due to surface absorption.

In another example, in FIG. 10a, a ring 1300 of a 1 meter diameter is oscillated at a frequency of 2 Hz in a water medium and a central pole 1301 is covered with energy absorbers from 1 to 10 meters up the pole and 7889 watts of solar energy would be collected.

In another example, FIG. 10b, a ring 1310 of a 2 meter diameter is oscillated at a frequency of 2 Hz in a water medium and a central pole 1311 is covered with energy absorbers from 1 to 10 meters up the pole and 14170 watts of solar energy would be collected.

In yet another example, FIG. 10c, a ring 1320 of a 3 meter diameter is oscillated at a frequency of 2 Hz in a water medium and a central pole 1321 is covered with energy absorbers from 1 to 15 meters up the pole and 32089 watts of solar energy would be collected.

Any and all publications, patents and patent applications mentioned in this specification are indicative of the level of skill of those skilled in the art to which this invention pertains. All publications, patents and patent applications mentioned herein are hereby incorporated by reference in their entirety to the same extent as if each individual publication or application was specifically and individually incorporated by reference.

It is to be understood that the invention is not to be limited to the exact configuration as illustrated and described herein. Accordingly, all expedient modifications readily attainable by one of ordinary skill in the art from the disclosure set forth herein, or by routine experimentation therefrom, are deemed to be within the spirit and scope of the invention as defined by the appended claims.

What is claimed is:

1. A process for collecting and concentrating solar energy comprising vibrating a ring to form waves within a liquid medium and reflecting the sun's energy off of the formed waves onto a collection area, wherein the vibration to form waves is adjusted to account for a pre-existing ambient surface condition of the liquid medium.

2. The process of claim 1, wherein the collection area is formed by one or more poles or columns fitted with energy absorption, transfer, or converting elements.

3. The process of claim 1, wherein the energy absorption, transfer, or converting elements comprises solar panels, liquid heat transfer tubes, molten salt, and/or mirrors.

4. A solar collection and concentration system comprising;
 a ring or ring assembly;
 a pole or column;
 a liquid medium used as a reflective surface;
 an actuation element to create a controlled motion to shape a lens in the liquid medium;

a sensor to detect an ambient surface condition of the liquid medium; and an energy absorption, transfer, or converting element, wherein the column extends from the reflective surface and the energy absorption, transfer, or converting element is disposed on the pole or column, wherein the lens focuses solar energy on to the energy absorption, transfer, or converting element; and the controlled motion to form the lens is adjusted to account for a pre-existing ambient surface condition of the liquid medium.

5. The solar collection and concentration system of claim 4, wherein the liquid medium is water.

6. The solar collection and concentration system of claim 4, wherein the actuation element is directly attached to the ring.

7. The solar collection and concentration system of claim 4, wherein the ring is in contact with the liquid medium.

8. The solar collection and concentration system of claim 4, wherein the energy absorption, transfer or converting elements are attached to the pole.

9. The solar collection and concentration system of claim 4, wherein the energy absorption element is used to heat a liquid medium in a pipe.

10. The solar collection and concentration system of claim 4, wherein the energy converting element is a solar panel.

11. The solar collection and concentration system of claim 4, wherein the energy transfer element is a reflective mirror.

12. The solar collection and concentration system of claim 4, wherein the pole may be angled to optimize the energy absorption, transfer, or converting.

13. The solar collection and concentration system of claim 4, wherein the pole extends below the surface of the liquid medium.

14. The solar collection and concentration system of claim 4, wherein the pole extends above the surface of the liquid medium.

15. The solar collection and concentration system of claim 14, wherein the pole extends at least 1, 2, 3, 4, 5, 6, 7, 8, 9, 10, 12, 13, 14, 15, 16, 17, 18, 19 or 20 meters above the surface of the liquid medium.

16. The solar collection and concentration system of claim 4, wherein the pole or column is centrally located within the ring.

17. The solar collection and concentration system of claim 4, wherein the building is fitted with one or more energy absorption, transfer, or converting elements.

18. The solar collection and concentration system of claim 4, wherein the liquid medium includes a reflective material within the medium.

19. The solar collection and concentration system of claim 4, wherein the actuation element uses rotary, linear, impact, harmonic, or turbulent actuation to create the controlled motion.

20. The solar collection and concentration system of claim 4, wherein the ambient surface condition comprises a plurality of background waves and the sensor detects a frequency of the background waves.

* * * * *